(12) United States Patent
Yamada

(10) Patent No.: US 12,738,555 B2
(45) Date of Patent: Sep. 15, 2026

(54) BATTERY PACK AND METHOD FOR PRODUCING BATTERY PACK

(71) Applicant: TOYOTA JIDOSHA KABUSHIKI KAISHA, Toyota Aichi-ken (JP)

(72) Inventor: Atsushi Yamada, Nisshin Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 475 days.

(21) Appl. No.: 18/400,645

(22) Filed: Dec. 29, 2023

(65) Prior Publication Data

US 2024/0234849 A1 Jul. 11, 2024

(30) Foreign Application Priority Data

Jan. 11, 2023 (JP) ................................ 2023-002128

(51) Int. Cl.
*H01M 10/613* (2014.01)
*H01M 10/6551* (2014.01)
(Continued)

(52) U.S. Cl.
CPC ..... *H01M 10/613* (2015.04); *H01M 10/6551* (2015.04); *H01M 50/204* (2021.01); *H01M 50/289* (2021.01); *H01M 10/0418* (2013.01); *H01M 10/052* (2013.01); *H01M 10/617* (2015.04); *H01M 10/647* (2015.04); *H01M 10/653* (2015.04); *H01M 10/6555* (2015.04); *H01M 10/6557* (2015.04); *H01M 50/20* (2021.01); *H01M 50/209* (2021.01); *H01M 2220/20* (2013.01); *Y02E 60/10* (2013.01)

(58) Field of Classification Search
CPC .......... H01M 10/0418; H01M 10/052; H01M 10/613; H01M 10/617; H01M 10/647; H01M 10/653; H01M 10/6551; H01M 10/6555; H01M 10/6557; H01M 2220/20; H01M 50/20; H01M 50/204; H01M 50/209; H01M 50/289; Y02E 60/10
See application file for complete search history.

(56) References Cited

U.S. PATENT DOCUMENTS

2010/0151309 A1* 6/2010 Marukawa .......... H01M 10/613
429/120
2014/0231552 A1 8/2014 Katsuno et al.

FOREIGN PATENT DOCUMENTS

| | | |
|---|---|---|
| JP | 2014-155904 A | 8/2014 |
| JP | 2017-195076 A | 10/2017 |
| JP | 2022-135610 A | 9/2022 |

* cited by examiner

*Primary Examiner* — Lingwen R Zeng
(74) *Attorney, Agent, or Firm* — Dinsmore & Shohl LLP

(57) ABSTRACT

A battery pack includes a first battery, a second battery, a cooling member, and a restraining member that restrains the first battery, the second battery and the cooling member in the thickness direction. The cooling member includes a first surface, a first convex part that surrounds an outer periphery of the first surface and protrudes to the first battery side on the basis of the first surface in the thickness direction, a second surface positioned on the opposite side to the first surface, and a second convex part that surrounds an outer periphery of the second surface and protrudes to the second battery side on the basis of the second surface in the thickness direction. A first heat conductive material layer is arranged on the first surface and a second heat conductive material layer is arranged on the second surface.

9 Claims, 12 Drawing Sheets

(51) Int. Cl.

| | |
|---|---|
| ***H01M 50/204*** | (2021.01) |
| ***H01M 50/289*** | (2021.01) |
| *H01M 10/04* | (2006.01) |
| *H01M 10/052* | (2010.01) |
| *H01M 10/617* | (2014.01) |
| *H01M 10/647* | (2014.01) |
| *H01M 10/653* | (2014.01) |
| *H01M 10/6555* | (2014.01) |
| *H01M 10/6557* | (2014.01) |
| *H01M 50/20* | (2021.01) |
| *H01M 50/209* | (2021.01) |

BATTERY PACK AND METHOD FOR PRODUCING BATTERY PACK

CROSS-REFERENCE TO RELATED APPLICATIONS

This application is based upon and claims the benefit of priority of the prior Japanese Patent Application No. 2023-002128, filed on Jan. 11, 2023, the entire contents of which are incorporated herein by reference.

TECHNICAL FIELD

The present disclosure relates to a battery pack and a method for producing a battery pack.

BACKGROUND ART

The development of batteries such as a lithium ion secondary battery has been actively carried out. For example, Patent Literature 1 discloses a bipolar type battery including: a bipolar electrode that includes a bipolar current collecting foil, a cathode mixture layer, and an anode mixture layer; and a unit cell that includes a cathode including a cathode current collecting foil and a cathode mixture layer, and an anode including an anode current collecting foil and an anode mixture layer. Also, Patent Literature 2 discloses a storage device provided with a plurality of storage cells layered in a first direction, and a heat conductive material arranged between the plurality of storage cells. Also, although it is not a technique relating to a battery, Patent Literature 3 discloses a coating nozzle capable of applying high viscosity paint with smooth coating appearance in a thin film and with appropriate pattern width.

CITATION LIST

Patent Literatures

Patent Literature 1: Japanese Patent Application Laid-Open (JP-A) No. 2017-195076
Patent Literature 2: JP-A No. 2022-135610
Patent Literature 3: JP-A No. 2014-155904

SUMMARY OF DISCLOSURE

Technical Problem

In a battery pack including a plurality of batteries, a cooling member may be arranged between two batteries facing to each other. Also, in the battery pack including a plurality of batteries, for example, in order to inhibit shifting of batteries in a direction orthogonal to the thickness direction of the batteries, restraining pressure may be applied to the thickness direction of the plurality of batteries. Arrangement of a frame shaped convex part in the cooling member is considered to prevent the unevenness of restraining pressure. Although the unevenness of the restraining pressure can be prevented by arranging the frame shaped convex part in the cooling member, there will be a space between the cooling member and the battery, and thus cooling of the battery by the cooling member may be insufficient.

The present disclosure has been made in view of the above circumstances, and a main object thereof is to provide a battery pack with cooling performance in which unevenness of restraining pressure can be suppressed.

Solution to Problem

[1]

A battery pack including a first battery, a second battery, a cooling member arranged between the first battery and the second battery in a thickness direction, and a restraining member that restrains the first battery, the second battery and the cooling member in the thickness direction, wherein the cooling member includes a first surface, a first convex part that surrounds an outer periphery of the first surface and protrudes to the first battery side on the basis of the first surface in the thickness direction, a second surface positioned on the opposite side to the first surface, and a second convex part that surrounds an outer periphery of the second surface and protrudes to the second battery side on the basis of the second surface in the thickness direction; a first heat conductive material layer is arranged on the first surface and a second heat conductive material layer is arranged on the second surface; the first heat conductive material layer includes a first region of which height is the same as a height of the first convex part; and the second heat conductive material layer includes a second region of which height is the same as a height of the second convex part.

[2]

The battery pack according [1], wherein the first battery and the second battery are electronically connected interposing the cooling member, and the first convex part and the second convex part are a conducting part.

[3]

The battery pack according to [1] or [2], wherein the cooling member includes: a first member including the first surface and the first convex part; a second member including the second surface and the second convex part; and a hollow member arranged between the first member and the second member in the thickness direction.

[4]

The battery pack according to any one of [1] to [3], wherein a first groove part is arranged in the first surface of the cooling member; and a second groove part is arranged in the second surface of the cooling member.

[5]

The battery pack according to any one of [1] to [4], wherein each of a rate of an area of the first heat conductive material layer relative to an area of the first surface, and a rate of an area of the second heat conductive material layer relative to an area of the second surface is 65% or more and 100% or less.

[6]

The battery pack according to any one of [1] to [5], wherein each of the first battery and the second battery includes at least one bipolar electrode.

[7]

A method for producing the battery pack according to any one of [1] to [6], the method comprising: a battery preparing step of preparing the first battery and the second battery; a cooling member preparing step of preparing the cooling member; a first precursor layer forming step of forming a first precursor layer by coating the first surface of the cooling member with a heat conductive material; a first heat conductive material layer forming step of forming the first heat conductive material layer from the first precursor layer by arranging the first battery on the first convex part in the cooling member, after the first precursor layer forming step; a second precursor layer forming step of forming a second precursor layer by coating the second surface of the cooling member with a heat conductive material; and a second heat conductive material layer forming step of forming the second heat conductive material layer from the second precursor layer by arranging the second battery on the second convex part in the cooling member, after the second precursor layer forming step, wherein a shape of cross-section of each of the first precursor layer and the second precursor layer viewed from the thickness direction is a convex shape.

[8]

The method for producing the battery pack according to [7], wherein the convex shape includes an arc-shaped surface.

[9]

The method for producing the battery pack according to [7] or [8], wherein the first precursor layer includes a first protruding region that protrudes more than the first convex part in the thickness direction; and the second precursor layer includes a second protruding region that protrudes more than the second convex part in the thickness direction.

Effects of Disclosure

The present disclosure exhibits an effect of providing a battery pack with cooling performance in which unevenness of restraining pressure can be suppressed.

BRIEF DESCRIPTION OF DRAWINGS

FIG. 11B is another schematic cross-sectional view explaining the mechanism preventing bubbles from remaining.

DESCRIPTION OF EMBODIMENTS

The embodiments in the present disclosure will be hereinafter explained in details with reference to drawings. Each drawing described as below is a schematic view, and the size and the shape of each portion are appropriately exaggerated in order to be understood easily. Furthermore, in the present description, upon expressing an embodiment of arranging one member with respect to the other member, when it is expressed simply "on" or "below", both of when the other member is directly arranged on or below the one member so as to contact with each other, and when the other member is arranged above or below the one member interposing an additional member, can be included unless otherwise described.

A. Battery Pack

Figure 1:
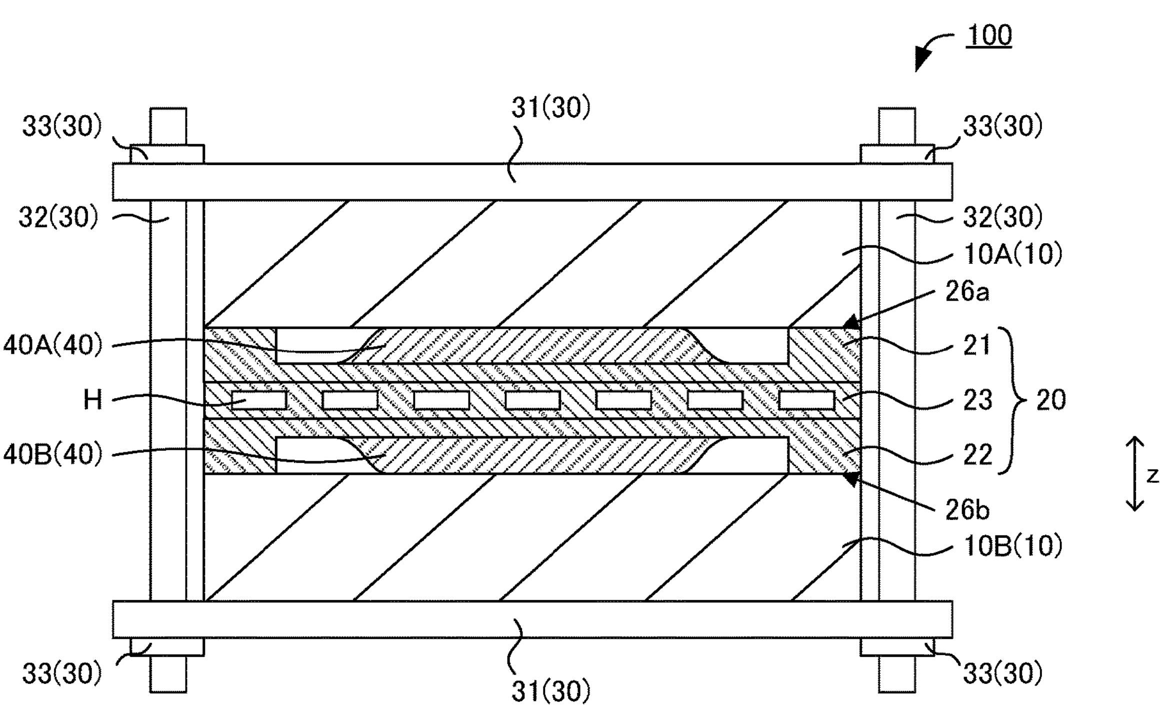
FIG. 1 is a schematic cross-sectional view exemplifying the battery pack in the present disclosure.

FIG. 1 is a schematic cross-sectional view exemplifying the battery pack in the present disclosure. As shown in FIG. 1, battery pack 100 is provided with first battery 10A, second battery 10B, cooling member 20 arranged between the first battery 10A and the second battery 10B in a thickness direction z, and restraining member 30 that restrains the first battery 10A, the second battery 10B, and the cooling member 20 in the thickness direction z.

Figure 2A:
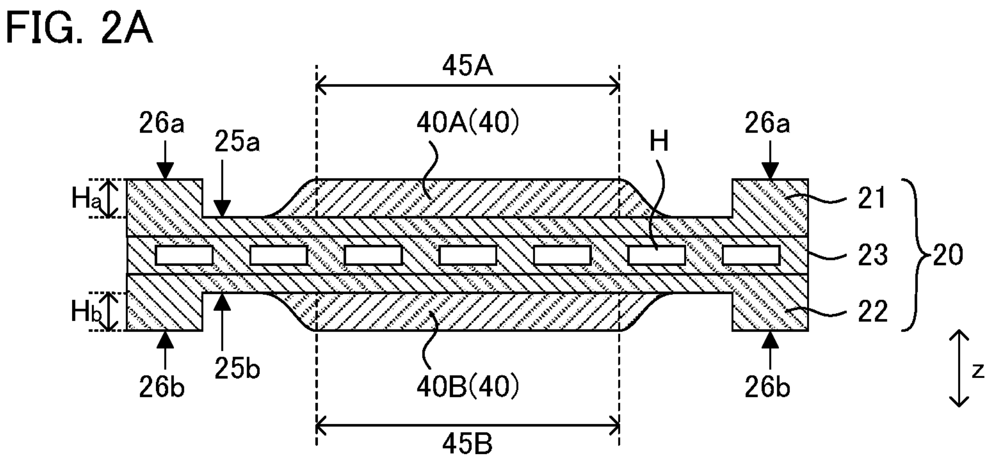
FIG. 2A is a schematic cross-sectional view exemplifying the cooling member and the heat conductive material layer in the present disclosure.
Figure 2B:
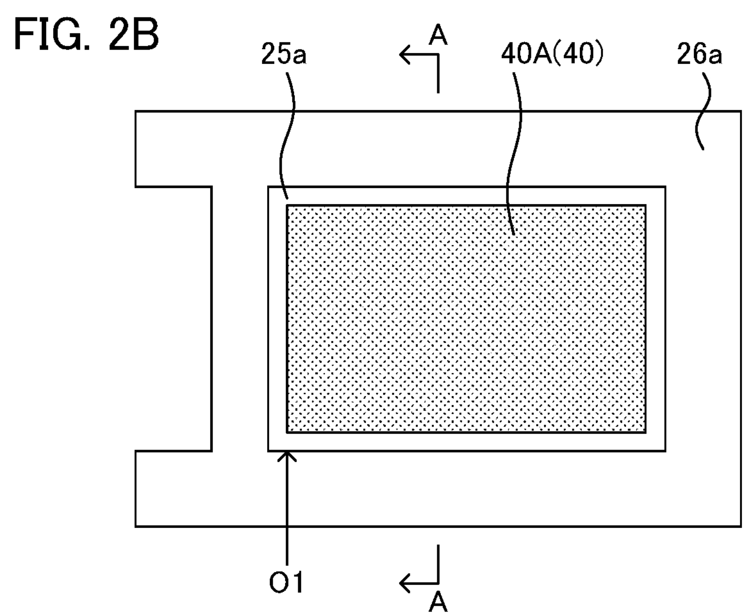
FIG. 2B is a schematic plan view exemplifying the cooling member and the heat conductive material layer in the present disclosure.

FIG. 2A is a schematic cross-sectional view exemplifying the cooling member in the present disclosure, and FIG. 2B is a schematic plan view exemplifying the cooling member in the present disclosure. FIG. 2A corresponds to the cross-sectional view of A-A in FIG. 2B. Incidentally, for convenience, descriptions of the first battery and the second battery are omitted in FIGS. 2A and 2B. As shown in FIGS. 2A and 2B, the cooling member 20 includes first surface 25*a*, first convex part 26*a* that surrounds outer periphery O1 of the first surface 25*a* and protrudes to the first battery side (upper side of the drawing in FIG. 2A) on the basis of the first surface 25*a* in the thickness direction z, second surface 25*b* positioned on the opposite side to the first surface 25*a*, and second convex part 26*b* that surrounds an outer periphery (not illustrated) of the second surface 25*b* and protrudes to the second battery side (down side of the drawing in FIG. 2A) on the basis of the second surface 25*b* in the thickness direction z.

As shown in FIG. 2A, first heat conductive material layer 40A is arranged on the first surface 25*a* and second heat conductive material layer 40B is arranged on the second surface 25*b*. The first heat conductive material layer 40A includes first region 45A of which height is the same as the height of the first convex part 26*a*, and the second heat conductive material layer 40B includes second region 45B of which height is the same as the height of the second convex part 26*b*.

According to the present disclosure, the cooling member includes the first convex part and the second convex part, and the first heat conductive material layer is arranged on the first surface of the cooling member and the second heat conductive material layer is arranged on the second surface of the cooling member, so that the unevenness of the restraining pressure can be suppressed and the battery pack may exhibit cooling performance.

As described above, in the battery pack including a plurality of batteries, a cooling member may be arranged between two batteries facing to each other. By arranging the cooling member, deterioration of the battery over time due to generation of heat in battery reactions can be inhibited. Also, in the battery pack including a plurality of batteries, for example, in order to inhibit shifting of batteries in a direction orthogonal to the thickness direction of the batteries, restraining pressure may be applied to the thickness direction of the plurality of batteries.

When the restraining pressure is applied, there may be unevenness of the restraining pressure to be actually applied, deriving from, for example, the deflection of the battery. In particular, the deflection easily occurs in a large-scaled battery, and thus the unevenness of the restraining pressure becomes remarkable. Arrangement of a frame shaped convex part in the cooling member is considered to prevent the unevenness of restraining pressure. Although the unevenness of the restraining pressure can be prevented by arranging the frame shaped convex part in the cooling member, there will be a space between the cooling member and the battery, and thus cooling of the battery by the cooling member may be insufficient.

In contrast, in the present disclosure, since the cooling member includes the first convex part and the second convex part, the unevenness of the restraining pressure can be suppressed. Further, since the first heat conductive material layer is arranged on the first surface of the cooling member and the second heat conductive material layer is arranged on the second surface of the cooling member, and thus cooling of the battery by the cooling member may be provided.

1. Battery

The battery pack in the present disclosure includes at least a first battery and a second battery. In the present disclosure, on the basis of the cooling member, a battery arranged in one surface side is defined as the first battery, and a battery arranged in the other surface side is defined as the second battery.

Figure 3:
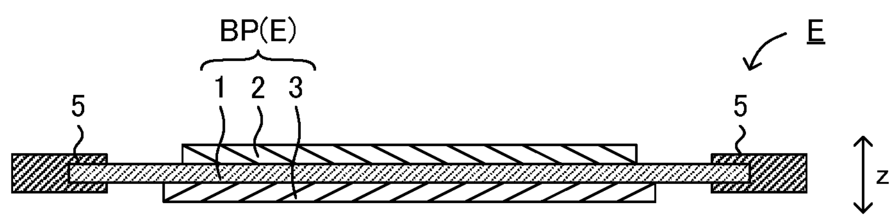
FIG. 3 is a schematic cross-sectional view exemplifying the electrode in the present disclosure.

The battery in the present disclosure usually includes an electrode. The electrode includes a current collector, and an electrode layer (cathode active material layer or anode active material layer) arranged on at least one surface of the current collector. FIG. 3 is a schematic cross-sectional view exemplifying the electrode in the present disclosure. As shown in FIG. 3, the electrode E is, for example, a bipolar electrode BP including current collector 1, cathode active material layer 2 arranged on one surface of the current collector 1, and anode active material layer 3 arranged on the other surface of the current collector 1 in a thickness direction Z.

Figure 4:
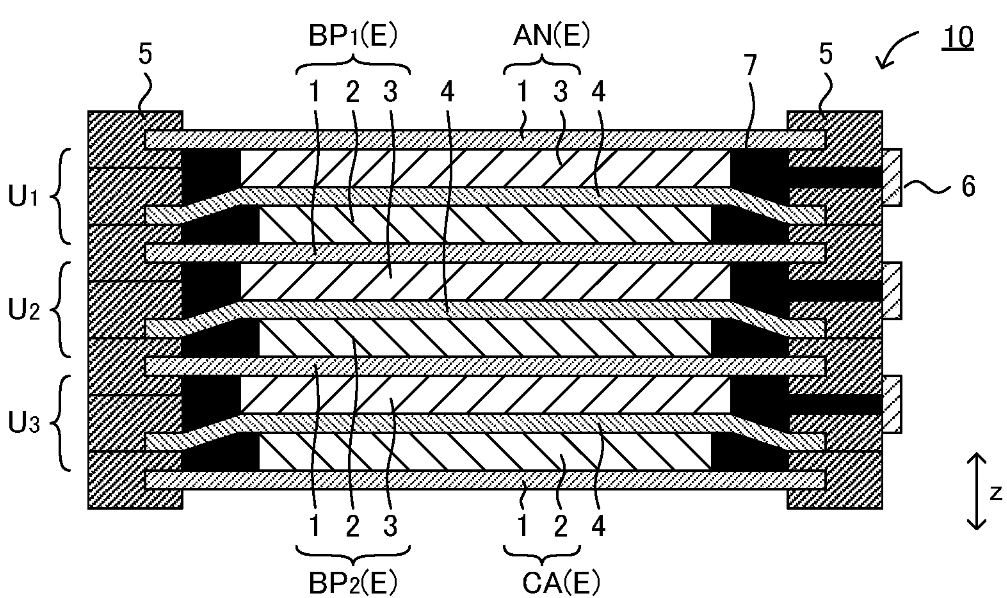
FIG. 4 is a schematic cross-sectional view exemplifying the battery in the present disclosure.

FIG. 4 is a schematic cross-sectional view exemplifying the battery in the present disclosure. In some embodiments, as shown in FIG. 4, battery 10 includes a plurality of electrode E layered in the thickness direction z. The battery 10 shown in FIG. 4 includes, as the electrode E, bipolar electrode $BP_1$, bipolar electrode $BP_2$, cathode side end electrode CA, and anode side end electrode AN. The bipolar electrode $BP_1$ and the bipolar electrode $BP_2$ respectively include current collector 1, cathode active material layer 2 arranged on one surface of the current collector 1, and anode active material layer 3 arranged on the other surface of the current collector 1. The cathode side end electrode CA includes current collector 1, and cathode active material layer 2 arranged on one surface of the current collector 1. The anode side end electrode AN includes current collector 1, and anode active material layer 3 arranged on one surface of the current collector 1. Incidentally, the battery in the present disclosure may not include the bipolar electrode.

As shown in FIG. 4, the battery 10 usually includes power generating element U ($U_1$ to $U_3$). The power generating unit U includes cathode active material layer 2, anode active material layer 3, and separator (electrolyte layer) 4 arranged between the cathode active material layer 2 and the anode active material layer 3. The power generating unit U shown in FIG. 4 is sealed with sealing member 5 and cover member 6, and filled with liquid electrolyte 7 inside. As a result, the cathode active material layer 2, the anode active material layer 3, and the separator 4 are respectively impregnated with the liquid electrolyte. Also, the battery in the present disclosure may include one of the power generating unit, and may include two or more thereof.

The battery 10 in FIG. 4 includes a plurality of power generating units ($U_1$, $U_2$, $U_3$) layered in the thickness direction z. As shown in FIG. 4, the plurality of power generating units may be connected to each other in series. Also, although not illustrated in particular, the plurality of power generating units may be connected to each other in parallel. The plurality of power generating units are each independent so that the liquid electrolyte does not circulate to each other. In FIG. 4, the plurality of power generating units $U_1$ to $U_3$ are each independent so that the liquid electrolyte does not circulate to each other. For example, the power generating unit $U_1$ and the power generating unit $U_2$ are divided by the current collector 1 and the seal member 5, and thus are each independent. In some embodiments, as shown in FIG. 4, the battery 10 includes a plurality of electrode E layered in the thickness direction z, and the seal member 5 arranged along with the outer periphery of the plurality of electrode E when viewed from the thickness direction z.

The shape of the battery in a plan view (shape viewed from the thickness direction) is, for example, square such as foursquare. The length of each side configuring the shape of the battery in a plan view is, for example, 30 cm or more, may be 60 cm or more, and may be 1 m or more. Meanwhile, the length of each side is, for example, 3 m or less.

As described above, in the present disclosure, on the basis of the cooling member, a battery arranged in one surface side is defined as the first battery, and a battery arranged in the other surface side is defined as the second battery. In the first battery and the second battery, the number of electrode may be the same or different. Likewise, in the first battery and the second battery, the number of power generating unit may be the same or different.

2. Cooling Member

The cooling member in the present disclosure is arranged between the first battery and the second battery in the thickness direction.

As shown in FIG. 2A and FIG. 2B, cooling member 20 includes first surface 25*a*, first convex part 26*a* that surrounds outer periphery O1 of the first surface 25*a* and protrudes to the first battery side (upper side of the drawing in FIG. 2A) on the basis of the first surface 25*a* in the thickness direction z, second surface 25*b* positioned on the opposite side to the first surface 25*a*, and second convex part that surrounds an outer periphery (not illustrated) of the second surface 25*b* and protrudes to the second battery side (down side of the drawing in FIG. 2A) on the basis of the second surface 25*b* in the thickness direction z. Also, in some embodiments, as shown in FIG. 2A, the cooling member 20 includes flow channel H that distributes a coolant.

As shown in FIG. 2A, the first surface 25*a* is a surface of which normal direction is the thickness direction z. Meanwhile, as shown in FIG. 2B, the first convex part 26*a* is arranged to surround the outer periphery O1 of the first surface 25*a*. Also, although not illustrated in particular, among the entire outer periphery of the first surface, the first convex part may be arranged to surround 50% or more of the outer periphery, may be arranged to surround 70% or more thereof, and may be arranged to surround 90% or more thereof. Also, the first convex part may be arranged to surround the entire periphery of the first surface. In other words, the first convex part 26*a* may be arranged in a frame shape with respect to the first surface. Also, as shown in FIG. 2A, the first convex part 26*a* protrudes to the first battery (upper side of the drawing in FIG. 2A) side on the basis of the first surface 25*a* in the thickness direction z. In some embodiments, the first convex part 26*a* is capable of surface contact with the first battery (not illustrated). The reason therefor is to reduce resistance when the first convex part 26*a* is used as a conductive part.

As shown in FIG. 2A, the second surface 25*b* is a surface positioned in the opposite side to the first surface 25*a*, and a surface of which normal direction is the thickness direction z. Also, although not illustrated in particular, the second convex part is arranged to surround the outer periphery of the second surface. Also, as shown in FIG. 2A, the second convex part 26*b* protrudes to the second battery side (down side of the drawing in FIG. 2A) on the basis of the second surface 25*b*, in the thickness direction z. Details of the second convex part are the same as those of the first convex part described above, in which description “the first” can be appropriately replaced by “the second”.

Figure 5A:
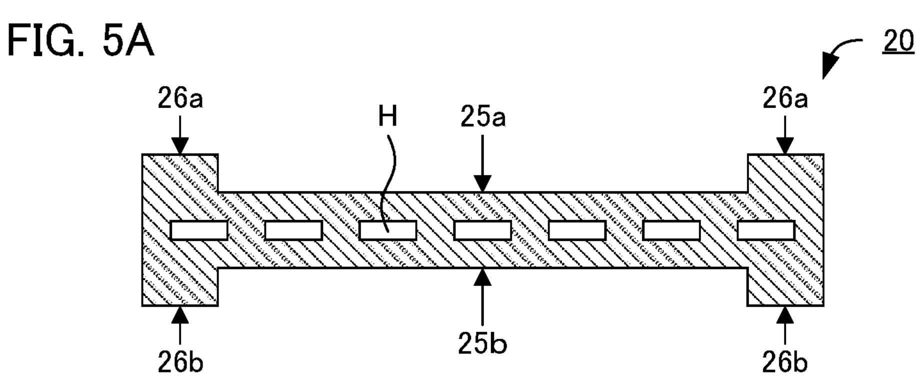
FIG. 5A is a schematic cross-sectional view exemplifying the cooling member in the present disclosure.
Figure 5B:
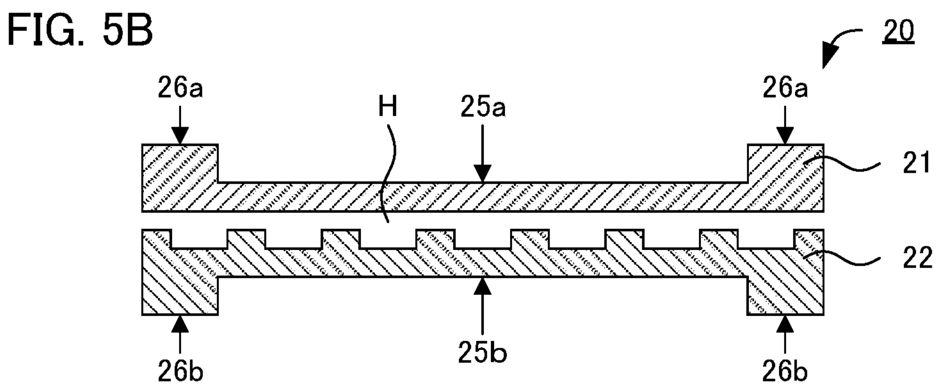
FIG. 5B is another schematic cross-sectional view exemplifying the cooling member in the present disclosure.
Figure 5C:
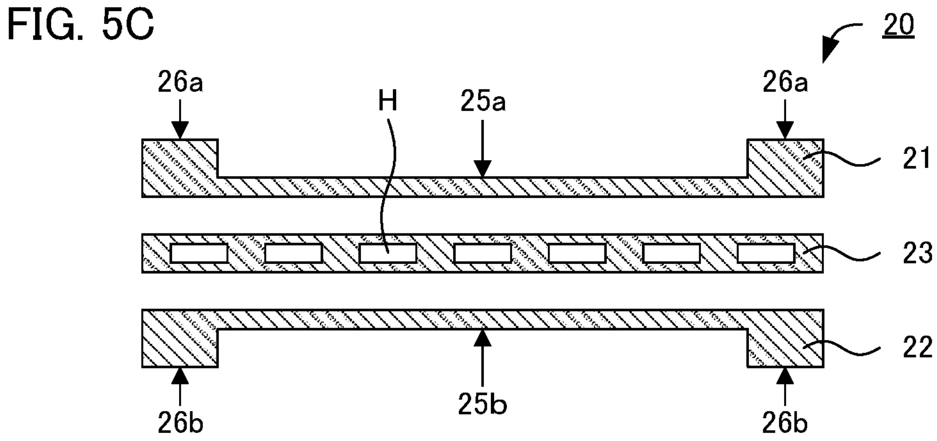
FIG. 5C is another schematic cross-sectional view exemplifying the cooling member in the present disclosure.

The cooling member in the present disclosure may be a single member and may be a member configured by a plurality of members. FIGS. 5A, 5B and 5C are schematic cross-sectional views exemplifying the cooling member in the present disclosure. Incidentally, FIG. 5B and FIG. 5C respectively correspond to deal drawings. For example, as shown in FIG. 5A, cooling member 20 may be a single member. On the other hand, as shown in FIG. 5B, the cooling member 20 may be a member configured by first member 21 including first surface 25*a* and first convex part 26*a*, and second member 22 including second surface 25*b* and second convex part 26*b*. In the cooling member 20 shown in FIG. 5B, a flat surface of the first member 21 and uneven surface of the second member form flow channel H.

As shown in FIG. 5C, the cooling member 20 may be a member configured by first member 21 including first surface 25*a* and first convex part 26*a*, second member 22 including second surface 25*b* and second convex part 26*b*, and hollow member 23 arranged between the first member 21 and the second member 22 in the thickness direction. The hollow member 23 includes flow channel H that distributes a coolant, as a hollow part.

Figures 6A, 6B:
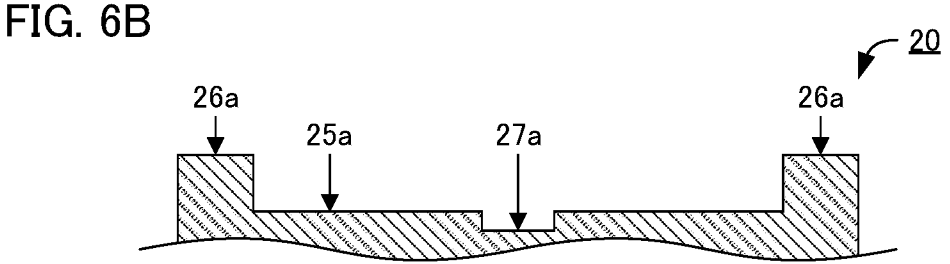
FIG. 6A is a schematic plan view exemplifying the cooling member in the present disclosure.
FIG. 6B is a schematic cross-sectional view exemplifying the cooling member in the present disclosure.

FIG. 6A is a schematic plan view exemplifying the cooling member in the present disclosure, and FIG. 6B is a cross-sectional view of A-A in FIG. 6A. As shown in FIG. 6A and FIG. 6B, first groove part 27*a* may be arranged in the first surface 25*a* of the cooling member 20. For example, by arranging a temperature sensor such as a thermocouple in the first groove part, the temperature of the battery pack can be more accurately monitored and controlled. Also, although not illustrated in particular, a second groove part may be arranged in the second surface of the cooling member. Details of the second groove part are the same as those of the first groove part described above, in which description “the first” can be appropriately replaced by “the second”.

In the present disclosure, the first battery and the second battery may be electronically connected interposing the cooling member. In this case, the first battery and the second battery may be connected in series and may be connected in parallel. Also, in some embodiments, when the first battery and the second battery are electronically connected interposing the cooling member, the first convex part and the second convex part are a conducting part. In some embodiments, the first battery and the second battery are electronically connected interposing at least the first convex part and the second convex part.

Figure 7:
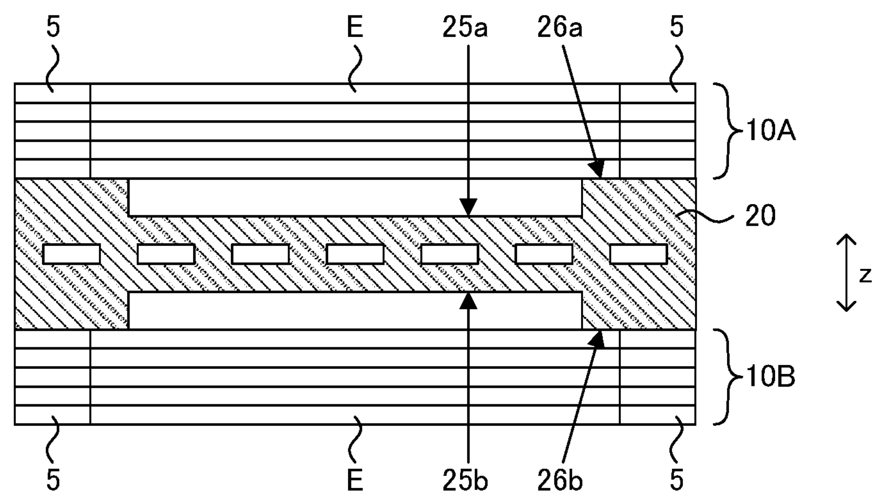
FIG. 7 is a schematic cross-sectional view exemplifying the battery and the cooling member in the present disclosure.

In some embodiments, as shown in FIG. 7, when viewed from the thickness direction z, the first convex part 26*a* in the cooling member 20 is arranged in a position overlapping the seal member 5 in the first battery 10A. In some embodiments, in the same manner, when viewed from the thickness direction z, the first convex part 26*a* in the cooling member 20 is arranged in a position overlapping the electrode E in the first battery 10A. Also, in some embodiments, when viewed from the thickness direction z, the first surface 25*a* in the cooling member 20 is arranged inside the outer periphery of the electrode E in the first battery 10A.

In some embodiments, as shown in FIG. 7, when viewed from the thickness direction z, the second convex part 26*b* in the cooling member 20 is arranged in a position overlapping the seal member 5 in the second battery 10B. In some embodiments, in the same manner, when viewed from the thickness direction z, the second convex part 26*b* in the cooling member 20 is arranged in a position overlapping the electrode E in the second battery 10B. Also, in some embodiments, when viewed from the thickness direction z, the second surface 25*b* in the cooling member 20 is arranged inside the outer periphery of the electrode E in the second battery 10B.

As shown in FIG. 2A, in the thickness direction z, $H_a$ designates the height of a part of the first convex part 26*a* protruding from the first surface 25*a*, and $H_b$ designates a part of the second convex part 26*b* protruding from the second surface 25*b*. The $H_a$ and the $H_b$ can be appropriately adjusted according to the size of the battery. The $H_a$ and the $H_b$ are respectively, for example, 0.70 mm or more, may be 1.00 mm or more, may be 1.20 mm or more, and may be 1.40 mm or more. Meanwhile, the $H_a$ and the $H_b$ are respectively, for example, 2.20 mm or less, may be 2.00 mm or less, may be 1.80 mm or less, and may be 1.60 mm or less.

There are no particular limitations on the material of the cooling member in the present disclosure, and examples thereof may include a metal such as aluminum, copper, iron and SUS.

3. Heat Conductive Material Layer

The battery pack in the present disclosure includes, as the heat conductive material layer, a first heat conductive material layer arranged on the first surface of the cooling member, and a second heat conductive material layer arranged on the second surface of the cooling member. Also, the first heat conductive material layer includes a first region of which height is the same as a height of the first convex part, and the second heat conductive material layer includes a second region of which height is the same as a height of the second convex part. In the first region, usually, the first heat conductive material layer contacts both of the first surface of the cooling member and the first battery. Similarly, in the second region, usually, the second heat conductive material layer contacts both of the second surface of the cooling member and the second battery.

The first heat conductive material layer and the second heat conductive material layer usually include a heat conductive material. The heat resistance of the heat conductive material is, for example, 0.2 K/W or less. Also, the volume resistance rate of the heat conductive material is, for example, $1*10^{10}$ Ω·cm or more. Also, the dielectric breakdown voltage of the heat conductive material is, for example, 5 kV or more. Examples of the heat conductive material may include a heat dissipation grease that can be softened at a room temperature (such as CGW™ (registered trademark) series from SEKISUI POLYMATECH CO., LTD.).

As shown in FIG. 2A, the first heat conductive material layer 40A includes first region 45A of which height is the same as the height $H_a$ of the first convex part 26*a*. The rate of the area of the first region 45A in the area of the first heat conductive material layer 40A may be 100%, and may be less than 100%. In the latter case, the rate is, for example, 50% or more, may be 70% or more, may be 90% or more, and may be 95% or more. Also, the rate of the area of the first heat conductive material layer with respect to the area of the first surface is, for example, 65% or more, may be 70% or more, may be 75% or more, and may be 80% or more. Meanwhile, the rate is, for example, 100% or less, may be 95% or less, may be 90% or less, and may be 85% or less.

As shown in FIG. 2A, the second heat conductive material layer 40B includes second region 45B of which height is the same as a height $H_b$ of the second convex part 26*b*. The rate of the area of the second region 45B in the area of the second heat conductive material layer 40B may be 100%, and may be less than 100%. In the latter case, the rate is, for example, 50% or more, may be 70% or more, may be 90% or more, and may be 95% or more. Also, the rate of the area of the second heat conductive material layer with respect to the area of the second surface is, for example, 65% or more, may be 70% or more, may be 75% or more, and may be 80% or more. Meanwhile, the rate is, for example, 100% or less, may be 95% or less, may be 90% or less, and may be 85% or less.

4. Restraining Member

The restraining member in the present disclosure is a member that restrains the first battery, the second battery and the cooling member, in the thickness direction.

The restraining member in the present disclosure is not particularly limited if it is a member capable of restraining the first battery, the second battery and the cooling member in the thickness direction, and a conventionally known restraining member may be used. For example, restraining member 30 shown in FIG. 1 includes a pair of end plate 31, connecting member 32 that connects the pair of end plate 31, and fixing member 33 that fixes the end plate 31 and the connecting member 32.

5. Battery Pack

The battery pack in the present disclosure includes two or more batteries. In the present disclosure, the battery pack may include three or more batteries, and may include four or more batteries.

Figure 8:
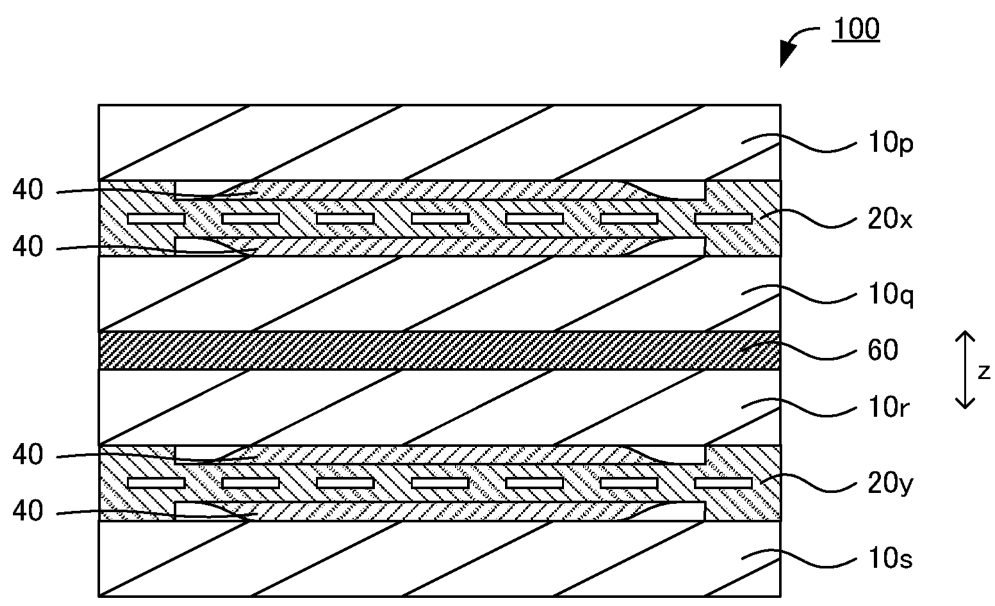
FIG. 8 is a schematic cross-sectional view exemplifying the battery pack in the present disclosure.

As described above, in the present disclosure, on the basis of the cooling member, a battery arranged in one surface side is defined as the first battery, and a battery arranged in the other surface side is defined as the second battery. FIG. 8 is a schematic cross-sectional view exemplifying the battery pack in the present disclosure. Incidentally, for convenience, the description of the restraining member is omitted. Battery pack 100 shown in FIG. 8 includes four battery 10 (10*p*, 10*q*, 10*r*, 10*s*). On the basis of the cooling member 20*x*, battery 10*p* arranged in one surface side corresponds to the first battery, and battery 10*q* arranged in the other surface side corresponds to the second battery. Also, on the basis of the cooling member 20*y*, battery 10*r* arranged in one surface side corresponds to the first battery, and battery 10*s* arranged in the other surface side corresponds to the second battery.

As shown in FIG. 8, in the thickness direction z, adhesive agent layer 60 may be arranged between adjacent batteries (battery 10*q* and battery 10*r*). By arranging the adhesive agent layer 60, positional deflection in a direction (left and right direction on the paper) orthogonal to the thickness direction z can be inhibited.

The battery pack in the present disclosure is typically a lithium ion secondary battery. Examples of the applications of the battery pack may include a power source for vehicles such as hybrid electric vehicles (HEV), plug-in hybrid electric vehicles (PHEV), battery electric vehicles (BEV), gasoline-fueled automobiles and diesel powered automobiles. In some embodiments, the battery pack may be used as a power source for driving hybrid electric vehicles (HEV), plug-in hybrid electric vehicles (PHEV), and battery electric vehicles (BEV). Also, the battery pack in the present disclosure may be used as a power source for moving bodies other than vehicles (such as rail road transportation, vessel and airplane), and may be used as a power source for electronic products such as information processing equipment.

B. Method for Producing Battery Pack

Figure 9:
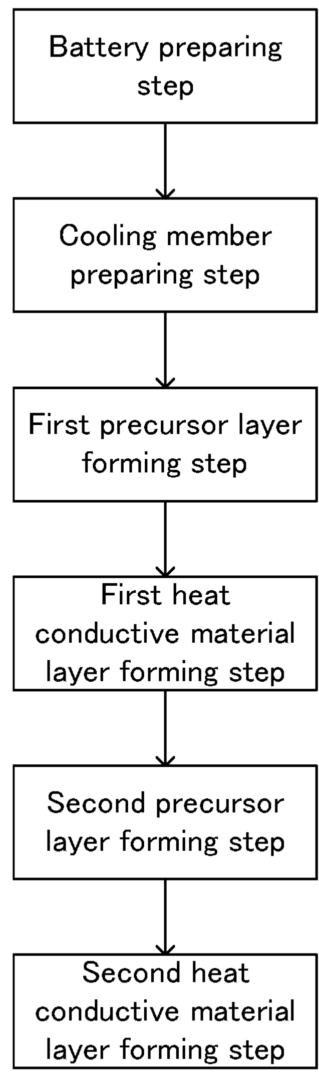
FIG. 9 is a flow chart exemplifying the method for producing the battery pack in the present disclosure.

The method for producing a battery pack in the present disclosure is a method for producing the battery pack described above. Also, as shown in FIG. 9, the method for producing the battery pack in the present disclosure includes a battery preparing step, a cooling member preparing step, a first precursor layer forming step, a first heat conductive material layer forming step, a second precursor layer forming step and a second heat conductive material layer forming step. The present disclosure features the points of using the specified cooling member, forming the specified heat conductive material layer, and that the cross-sectional shape of the precursor layer has a convex shape.

According to the present disclosure, by using the cooling member including the first convex part and the second convex part, and further forming the heat conductive material layer between the cooling member and the battery, cooling performance can be obtained while suppressing the unevenness of the restraining pressure. Also, the cross-sectional shape of the precursor layer is a convex shape, and thus remaining of bubbles can be suppressed.

Figure 10A:
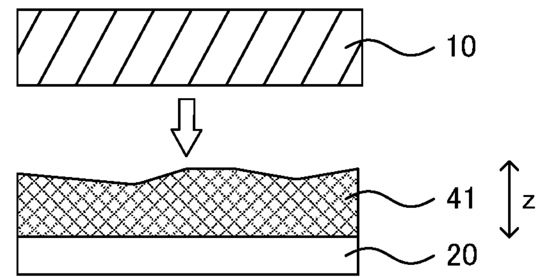
FIG. 10A is a schematic cross-sectional view explaining the mechanism by which bubbles remain.
Figure 10B:
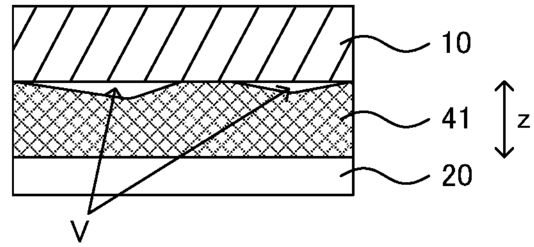
FIG. 10B is another schematic cross-sectional view explaining the mechanism by which bubbles remain.
Figure 10C:
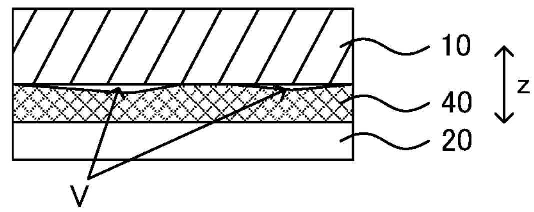
FIG. 10C is another schematic cross-sectional view explaining the mechanism by which bubbles remain.

Here, the remaining of bubbles will be explained with reference to FIGS. 10A to 10C and FIGS. 11A to 11C. As shown in FIG. 10A, for example, when precursor layer 41 is formed on a surface of the cooling member 20 by a printing method, minute concave and convex are formed on the surface of the precursor layer 41 that is the battery 10 side. In particular, when a heat conductive material with high viscosity is used, minute concave and convex are easily formed. As shown in FIG. 10B, when the battery 10 and the cooling member 20 are pressurized in a state the minute concave and convex are formed, the minute concave and convex will not disappear but remain on the surface of the precursor layer 41 that is the battery 10 side. As a result, as shown in FIG. 10C, heat conductive material layer 40 in which babble V remains is formed. The bubble V works as a heat insulating layer, and thus cooling of the battery 10 by the cooling member 20 is inhibited.

Figure 11A:
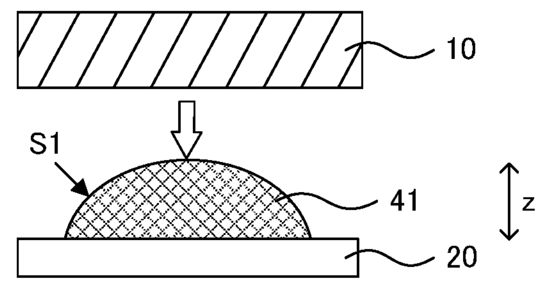
FIG. 11A is a schematic cross-sectional view explaining the mechanism preventing bubbles from remaining.
Figure 11A:
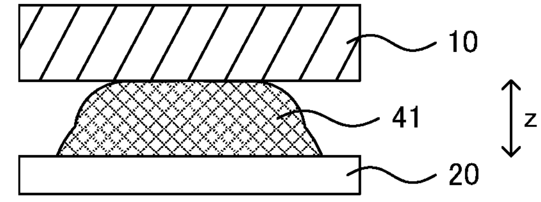
Figure 11C:
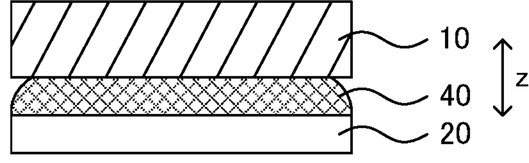
FIG. 11C is another schematic cross-sectional view explaining the mechanism preventing bubbles from remaining.

In contrast, in the method for producing the battery pack in the present disclosure, as shown in FIG. 11A, in the precursor layer forming step, the precursor layer 41 of which cross-sectional shape is a convex shape is formed. The convex shape refers to a shape of which center protrudes more than the both edges. Since the cross-sectional shape of the precursor layer 41 is the convex shape, as shown in FIG. 11B, when the precursor layer 41 is pressurized in the thickness direction z, the precursor layer 41 is deformed to be widened to the direction (left and right direction on the paper) orthogonal to the thickness direction. On the occasion of the deformation, air is pushed out. As a result, as shown in FIG. 11C, the heat conductive material layer 40 in which remaining of bubbles is suppressed is formed.

1. Battery Preparing Step

The battery preparing step in the present disclosure is a step of preparing the first battery and the second battery. The first battery and the second battery are in the same contents as those described in "A. Battery pack"; thus, the descriptions herein are omitted.

Figure 12A:
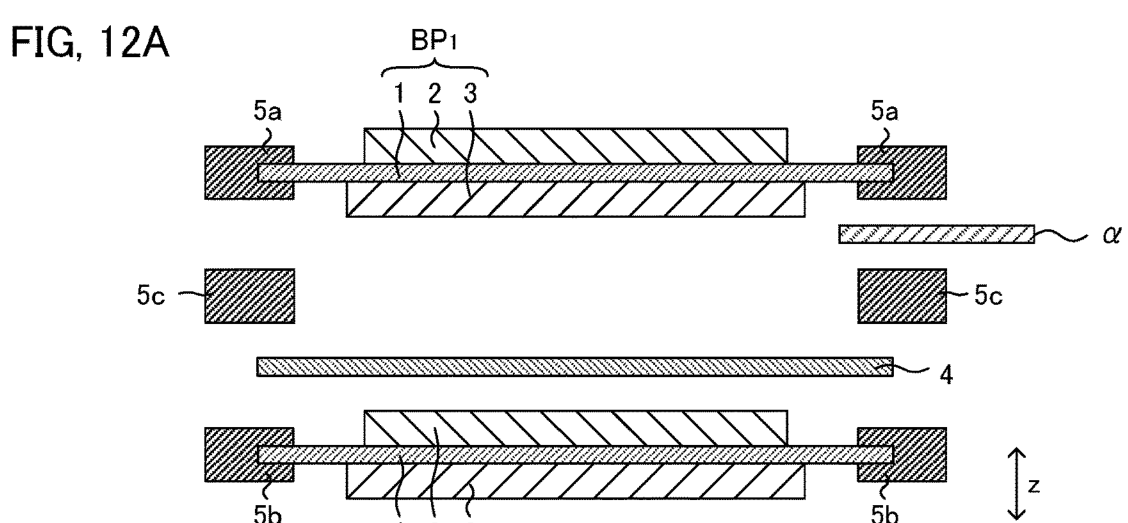
FIG. 12A is a schematic cross-sectional view exemplifying the battery preparing step in the present disclosure.
Figure 12B:
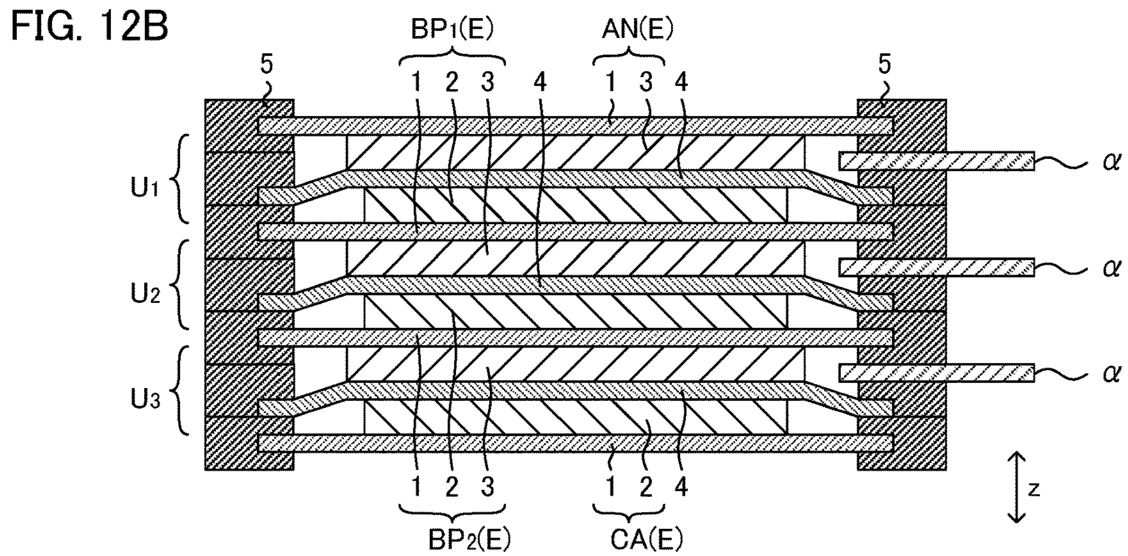
FIG. 12B is another schematic cross-sectional view exemplifying the battery preparing step in the present disclosure.
Figure 12C:
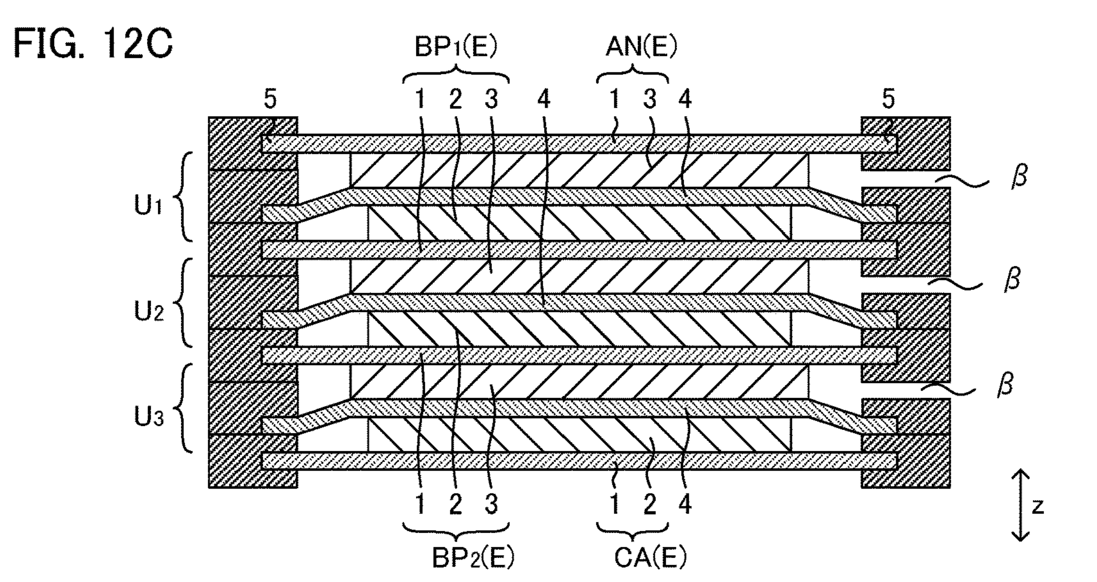
FIG. 12C is another schematic cross-sectional view exemplifying the battery preparing step in the present disclosure.

FIGS. 12A to 12C are schematic cross-sectional views exemplifying the battery preparing step. First, As shown in FIG. 12A, bipolar electrode $BP_1$ and bipolar electrode $BP_2$ are prepared. The bipolar electrode $BP_1$ and the bipolar electrode $BP_2$ respectively include frame member 5*a* and 5*b* for forming seal member, arranged along with the outer periphery of the current collector 1. Next, the anode active material layer 3 in the bipolar electrode $BP_1$ and the cathode active material layer 2 in the bipolar electrode $BP_2$ are faced to each other interposing separator 4. On this occasion, at least a part of the outer periphery of the separator 4 is arranged between the frame member 5*a* and the frame member 5*b*. Also, as shown in FIG. 12A, nest $\alpha$ and frame member (spacer) 5*c* are arranged between the frame member 5*a* in the bipolar electrode $BP_1$ and the frame member 5*b* in the bipolar electrode $BP_2$. Next, although not illustrated in particular, cathode side end electrode CA and anode side end electrode AN are also layered. After that, a plurality of frame members layered are welded to form the seal member 5. In this manner, a layered member shown in FIG. 12B is obtained. Next, as shown in FIG. 12C, by pulling out the nest $\alpha$ from the obtained layered member, penetration hole $\beta$ that penetrates the seal member 5 is formed. Next, although not illustrated in particular, a liquid electrolyte is injected from the penetration hole, and after the injection, the penetration hole is sealed with a resin. In this manner, battery 10 shown in FIG. 4 is obtained.

2. Cooling Member Preparing Step

The cooling member preparing step in the present disclosure is a step of preparing the cooling member. The cooling member is in the same contents as those described in "A. Battery pack"; thus, the descriptions herein are omitted.

3. First Precursor Layer Forming Step

The first precursor layer forming step in the present disclosure is a step of forming a first precursor layer by coating the first surface of the cooling member with a heat conductive material. The heat conductive material is in the same contents as those described in "A. Battery pack"; thus, the descriptions herein are omitted.

There are no particular limitations on the method for applying the heat conductive material, and examples thereof may include a method of applying the heat conductive material in a line shape or a dot shape using a nozzle. When the heat conductive material is applied in a line shape or a dot shape, it may be applied in one line or may be applied in two lines or more along with a first direction. In some embodiments, when the above described first groove part is arranged in the first surface, the heat conductive material is not applied to the first groove part.

The cross-sectional shape of the first precursor layer viewed from the thickness direction is usually a convex shape. For example, if the first precursor layer is in a line shape when viewed from the thickness direction, the shape of the cross-section cut from the thickness direction of the first precursor layer along with the direction orthogonal to the direction the line extends, in some embodiments, is a convex shape. In some embodiments, as shown in FIG. 11A, the precursor layer 41 includes arc-shaped surface S1.

In some embodiments, the first precursor layer includes a first protruding region that protrudes more than the first convex part in the thickness direction. The rate of the height of the first protruding region with respect to the height of the first convex part is, for example, 1.01 or more and 1.30 or less. Also, when viewed from the thickness direction, the rate of the area of the first protruding region with respect to the area of the first precursor layer is usually less than 100%. Meanwhile, the rate is, for example, 50% or more and may be 70% or more.

4. First Heat Conductive Material Layer Forming Step

The first heat conductive material layer forming step in the present disclosure is a step of forming the first heat conductive material layer from the first precursor layer by arranging the first battery on the first convex part in the cooling member, after the first precursor layer forming step. In specific, the first precursor layer is pressurized by the first battery to form the first heat conductive material layer. Also, when the first precursor layer is pressurized by the first battery, the above described first region is formed.

In some embodiments, in the first heat conductive material layer forming step, the first battery is arranged in an upper side of the gravity direction relative to the first convex part in the cooling member, and the first battery is arranged on the first convex part in the cooling member. Also, on the occasion of arranging the first battery on the first convex part of the cooling member, the first precursor layer may be pressurized by the weight of the first battery itself, and the first precursor layer may be pressurized in the manner the first battery and the cooling member are pressurized by a pressure device. The reason therefor is to further prevent bubbles from remaining. The details of the first heat conductive material layer are in the same contents as those described in "A. Battery pack" above.

5. Second Precursor Layer Forming Step

The second precursor layer forming step in the present disclosure is a step of forming a second precursor layer by coating the second surface of the cooling member with a heat conductive material. Details of the second precursor layer forming step are in the same contents as those described in the first precursor layer forming step described above, in which description "the first" can be appropriately replaced by "the second".

6. Second Heat Conductive Material Layer Forming Step

The second heat conductive material layer forming step in the present disclosure is a step of forming the second heat conductive material layer from the second precursor layer by arranging the second battery on the second convex part in the cooling member, after the second precursor layer forming step. The details of the second heat conductive material layer forming step are in the same contents as those of the first heat conductive material layer forming step described above, in which "the first" can be appropriately replaced by "the second".

7. Restraining Step

The method for producing the battery pack in the present disclosure may include a restraining step of restraining the first battery, the second battery and the cooling member in the thickness direction using a restraining member, for example, after the first heat conductive material layer forming step and the second heat conductive material layer forming step. The restraining member is in the same contents as those described in "A. Battery pack"; thus, the descriptions herein are omitted.

8. Battery Pack

The battery pack produced by the above described method is in the same contents as those described in "A. Battery pack"; thus, the descriptions herein are omitted.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SINGS LIST

1 current collector
2 cathode active material layer
3 anode active material layer
4 separator
E electrode
BP bipolar electrode
U power generating unit
10A first battery
10B second battery
20 cooling member
21 first member
22 second member
23 hollow member
30 restraining member
40 heat conductive material layer
100 battery pack

What is claimed is:

1. A battery pack comprising a first battery, a second battery, a cooling member arranged between the first battery and the second battery in a thickness direction, and a restraining member that restrains the first battery, the second battery and the cooling member in the thickness direction, wherein the cooling member includes a first surface, a first convex part that surrounds an outer periphery of the first surface and protrudes to the first battery side on a basis of the first surface in the thickness direction, a second surface positioned on the opposite side to the first surface, and a second convex part that surrounds an outer periphery of the second surface and protrudes to the second battery side on a basis of the second surface in the thickness direction;

a first heat conductive material layer is arranged on the first surface and a second heat conductive material layer is arranged on the second surface;

the first heat conductive material layer includes a first region of which height is the same as a height of the first convex part; and the second heat conductive material layer includes a second region of which height is the same as a height of the second convex part.

2. The battery pack according to claim 1, wherein the first battery and the second battery are electronically connected interposing the cooling member, and the first convex part and the second convex part are a conducting part.

3. The battery pack according to claim 1, wherein the cooling member includes:

a first member including the first surface and the first convex part;

a second member including the second surface and the second convex part; and a hollow member arranged between the first member and the second member in the thickness direction.

4. The battery pack according to claim 1, wherein a first groove part is arranged in the first surface of the cooling member; and a second groove part is arranged in the second surface of the cooling member.

5. The battery pack according to claim 1, wherein each of a rate of an area of the first heat conductive material layer relative to an area of the first surface, and a rate of an area of the second heat conductive material layer relative to an area of the second surface is 65% or more and 100% or less.

6. The battery pack according to claim 1, wherein each of the first battery and the second battery includes at least one bipolar electrode.

7. A method for producing the battery pack according to claim 1, the method comprising:

a battery preparing step of preparing the first battery and the second battery;

a cooling member preparing step of preparing the cooling member;

a first precursor layer forming step of forming a first precursor layer by coating the first surface of the cooling member with a heat conductive material;

a first heat conductive material layer forming step of forming the first heat conductive material layer from the first precursor layer by arranging the first battery on the first convex part in the cooling member, after the first precursor layer forming step;

a second precursor layer forming step of forming a second precursor layer by coating the second surface of the cooling member with a heat conductive material; and a second heat conductive material layer forming step of forming the second heat conductive material layer from the second precursor layer by arranging the second battery on the second convex part in the cooling member, after the second precursor layer forming step, wherein a shape of cross-section of each of the first precursor layer and the second precursor layer viewed from the thickness direction is a convex shape.

8. The method for producing the battery pack according to claim 7, wherein the convex shape includes an arc-shaped surface.

9. The method for producing the battery pack according to claim 7, wherein the first precursor layer includes a first protruding region that protrudes more than the first convex part in the thickness direction; and the second precursor layer includes a second protruding region that protrudes more than the second convex part in the thickness direction.

* * * * *